United States Patent Office.

AUGUSTUS BISCHLER, OF BASLE, SWITZERLAND, ASSIGNOR TO BASLE CHEMICAL WORKS, OF SAME PLACE.

PROCESS OF PRODUCING CHLORIDS OF AROMATIC SULFONIC ACIDS.

SPECIFICATION forming part of Letters Patent No. 667,861, dated February 12, 1901.

Application filed August 25, 1900. Serial No. 28,014. (No specimens.)

*To all whom it may concern:*

Be it known that I, AUGUSTUS BISCHLER, chemist and doctor of philosophy, a subject of the Emperor of Russia, and a resident of Basle, Switzerland, have invented a new Process of Manufacturing Chlorids of the Aromatic Sulfonic Acids, of which the following is a clear and complete specification.

I have found that the chlorids of the aromatic sulfonic acids may be obtained with ease and in a pure state by means of the aromatic sulfinic acids by treating these sulfinic acids as such or their salts with chlorin.

Among the aromatic sulfinic acids the orthotoluenesulfinic acid, as well as the ethereal salts of the orthosulfinicbenzoic acid, is specially important for the preparation of the chlorids, by means of which the pure saccharin is directly obtained. I shall therefore only describe the process for the preparation of the products resulting from the above-mentioned sulfinic acids.

By passing chlorin in an aqueous solution of a salt of the orthotoluenesulfinic acid or of the ethereal salts of the orthosulfinicbenzoic acid the respective sulfochlorids are formed according to the following formula:

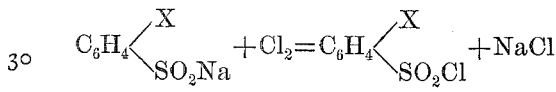

in which X stands for $CH_3$ or $COOR$, respectively, R being in alkyl group.

If the aqueous solutions of the salts of the sulfinic acids are liberated with mineral acids and chlorin is introduced into the suspension, the chlorids of the sulfonic acid are equally formed, besides the muriatic acid.

Example I: Dissolve ten kilos of orthotoluenesulfinic acid in diluted caustic soda. Into this solution chlorin is introduced until the formation of oily chlorid has ceased. Cool the solution which gets warm by the action of the chlorin, separate the orthotoluenesulfochlorid by decantation, and wash it with water. The orthotoluenesulfochlorid is also obtained by mixing the above-mentioned solution of the sodium salt of the sulfinic acid with muriatic acid and by passing through the solution (containing sulfinic acid, which is partly dissolved and partly suspended) a strong current of chlorin. By the force of the current of chlorin the solution is more or less heated; but the temperature should be regulated so as not to surpass 35° to 40° centigrade.

Example II: The methyl orthosulfinicbenzoate (melting-point 98° to 99° centigrade) obtained from the methylic ether of the anthranilic acid has to be dissolved in the necessary quantity of diluted alkali and must be treated with chlorid according to Example I. Thus the orthosulfochlorid of methyl benzoate is obtained which will melt at 64° to 65° centigrade.

Having thus described my invention, I claim—

The herein-described process for producing chlorids of the aromatic sulfonic acids, which consists in treating the corresponding aromatic sulfinic acids with chlorin, substantially as set forth.

In witness whereof I have hereunto signed my name, this 11th day of August, 1900, in the presence of two subscribing witnesses.

AUGUSTUS BISCHLER.

Witnesses:
  GEO. GIFFORD,
  AMAND RITTER.